US009087187B1

(12) United States Patent
Doane

(10) Patent No.: US 9,087,187 B1
(45) Date of Patent: Jul. 21, 2015

(54) UNIQUE CREDENTIALS VERIFICATION

(71) Applicant: Amazon Technologies, Inc., Reno, NV (US)

(72) Inventor: Andrew J. Doane, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 243 days.

(21) Appl. No.: 13/647,182

(22) Filed: Oct. 8, 2012

(51) Int. Cl.
| G06F 21/46 | (2013.01) |
| H04L 9/32 | (2006.01) |
| G06F 21/31 | (2013.01) |
| H04L 29/06 | (2006.01) |
| G06F 21/60 | (2013.01) |
| G06F 21/62 | (2013.01) |
| H04L 9/00 | (2006.01) |
| H04L 9/06 | (2006.01) |

(52) U.S. Cl.
CPC ............... *G06F 21/46* (2013.01); *G06F 21/31* (2013.01); *G06F 21/604* (2013.01); *H04L 9/321* (2013.01); *H04L 9/3226* (2013.01); *H04L 9/3236* (2013.01); *H04L 63/0478* (2013.01); *H04L 63/083* (2013.01); *H04L 63/12* (2013.01); *G06F 21/602* (2013.01); *G06F 21/6218* (2013.01); *G06F 2221/2115* (2013.01); *G06F 2221/2117* (2013.01); *H04L 9/002* (2013.01); *H04L 9/0643* (2013.01)

(58) Field of Classification Search
None
See application file for complete search history.

(56) References Cited

U.S. PATENT DOCUMENTS

| 5,204,966 | A | * | 4/1993 | Wittenberg et al. ............... 726/6 |
| 7,693,797 | B2 | | 4/2010 | Ekberg |
| 7,698,549 | B2 | | 4/2010 | Thornton et al. |
| 7,958,141 | B2 | | 6/2011 | Sundaresan et al. |
| 8,078,881 | B1 | | 12/2011 | Liu |
| 8,185,962 | B2 | | 5/2012 | Moore |
| 8,495,715 | B2 | * | 7/2013 | Henderson et al. ............... 726/6 |
| 2004/0260953 | A1 | | 12/2004 | Jamieson et al. |
| 2005/0091545 | A1 | | 4/2005 | Soppera |
| 2010/0017603 | A1 | | 1/2010 | Jones |
| 2010/0174758 | A1 | | 7/2010 | Radenkovic et al. |
| 2011/0154048 | A1 | | 6/2011 | Stieglitz et al. |
| 2012/0311684 | A1 | | 12/2012 | Paulsen et al. |
| 2013/0021949 | A1 | | 1/2013 | Kaal |
| 2013/0125221 | A1 | * | 5/2013 | Agrawal ............... 726/6 |

OTHER PUBLICATIONS

Zhang, H., Wang, W., "Study on Strategy of Account Security Based on SQL Server Database", Copyright 2009 IEEE.*
Chen, T., Lee, W., "A new method for using hash functions to solve remote user authentication", Science Direct, Computers and Electrical Engineering 34 (2008) pp. 53-62, Copyright 2007 Elsevier Ltd.*

* cited by examiner

*Primary Examiner* — Andrew Nalven
*Assistant Examiner* — Christopher Ruprecht
(74) *Attorney, Agent, or Firm* — Sutherland Asbill & Brennan LLP

(57) ABSTRACT

Systems and methods for receiving a session and establishing authentication credentials associated with a user by verifying the uniqueness of requested authentication credentials among one or more entities by one or more credential verification servers. Once the authentication credentials associated with the user are established, the session may be transferred back.

19 Claims, 7 Drawing Sheets

US 9,087,187 B1

UNIQUE CREDENTIALS VERIFICATION

BACKGROUND

Many websites and/or web services require the establishment of authentication or login credentials for access by users. The website and/or web service may allow the user to select a login, password, or other elements of the authentication credentials. As a result, the user may select a login and password to access the content and/or services associated with the website and/or web service. The user may further interact with other websites and/or web services and select logins and passwords associated with those other websites and/or web services. In some cases, the user may select logins and passwords that are similar across various websites or web services. By doing so, the user may subject all of his/her accounts at the multiple websites and/or web services to potentially higher probability of unauthorized access. For example, if one of the login and password pairs associated with one of the user's websites and/or web service accounts is compromised, then the same compromised login and password pair may be used for unauthorized access to other websites and/or web services associated with the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
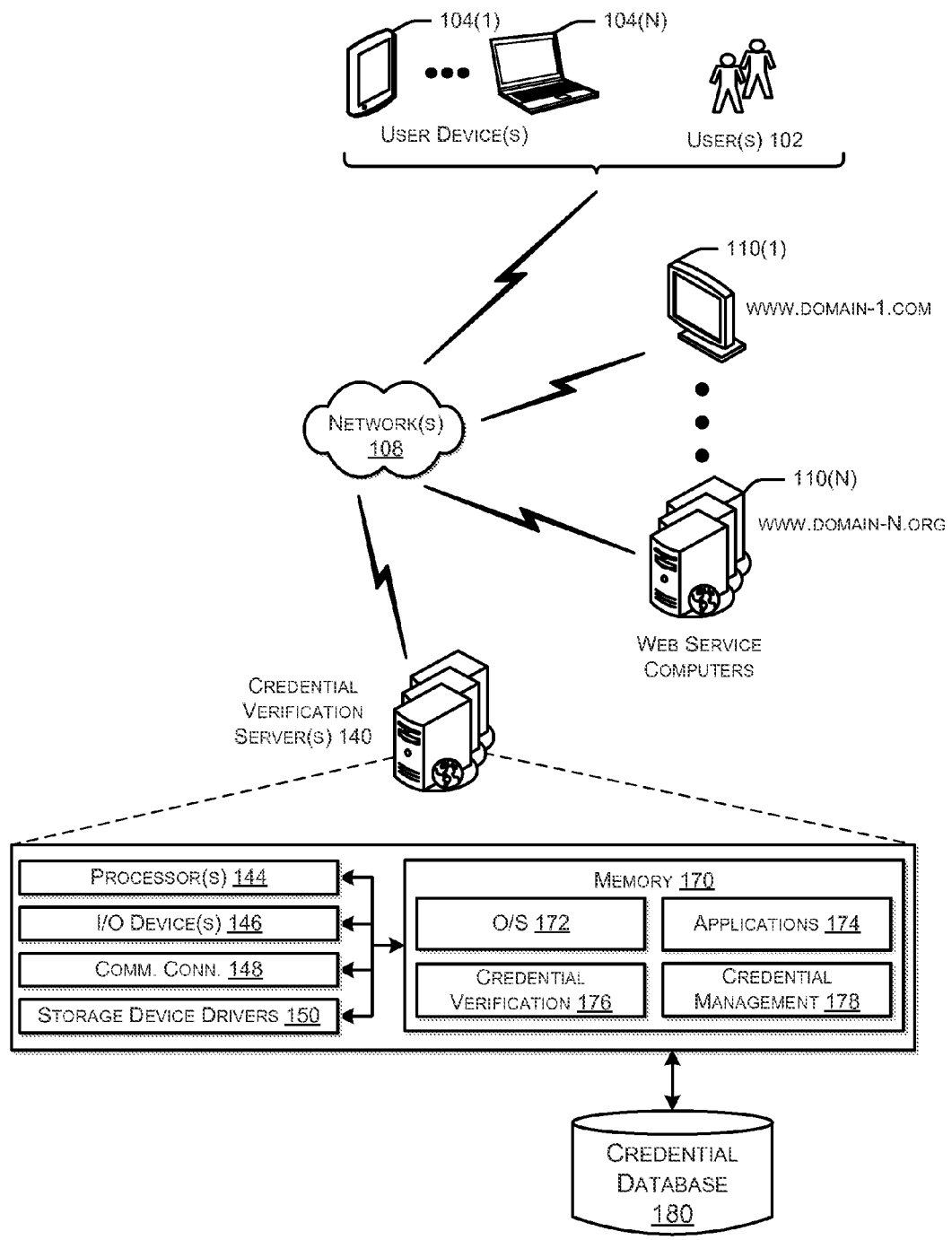
FIG. 1 illustrates an example architecture for providing unique credentials verification, in accordance with embodiments of the disclosure.

Embodiments of the present disclosure are directed to, among other things, unique login credential verification, including unique credential enforcement.

Websites and/or web services that allow access to users by authenticating users using user authentication credentials, such as a login and password pair, generally advise users to select unique user authentication credentials for each of his/her websites and/or web services. If the user does not select unique passwords for each of his/her accounts at various websites and/or web services, then if the user's authentication credentials are compromised at one website and/or web server, then the user's authentication credentials may be compromised at other websites and/or web servers. However, if the user was to select a unique set of user authentication credentials for each website and/or web service with which the user has an account, then if the user authentication credentials were compromised at one website and/or web service, then other websites and/or web servers with which the user has accounts may still remain secure. Therefore, if a particular user has a unique set of authentication credentials at a variety of websites and/or web services, then a compromise of one of the user's set of user authentication credentials may result in relatively lower losses compared to a situation where the user does not have unique user authentication credentials for each of his/her website and/or web service accounts.

In some aspects, websites and/or web services may verify if a set of user authentication credentials is unique prior to setting up an account for a particular user. In one aspect, a particular website and/or web service may communicate with one or more third party credential verification servers to determine if a set of user authentication credentials are unique across a plurality of websites and/or web services. The website and/or web service may receive a requested set of user credentials, such as a login and password, to access the website and/or web services from a particular user that wishes to set up an account on the website and/or web service. The website and/or web service may be hosted by one or more web service computers. The web service computers, and the processors thereon, may generate a code, information, and/or encryption associated with the requested set of user authentication credentials. For example, the web service computers may perform an encryption, such as a one-way hash, of the requested set of user credentials. The web service computers may then send the encryption of the requested set of user credentials to the third party credential verification servers via a network. In some cases, the transmission of the encrypted requested user authentication credentials may be over a secure transmission, such as by using a public/private key encryption.

When the credential verification servers receive the encrypted requested authentication credentials, the credential verification servers may perform a second encryption and compare the result against other doubly encrypted requested authentication credential stored on a credential database. In one aspect, the credential verification servers may update its credential database of encrypted requested authentication credentials with the encryption of the newly received encrypted requested authentication credentials. The database may include a listing of all of the encrypted requested authentication credentials that have been verified by the credential verification servers. Based, at least in part, on comparing the encrypted requested authentication credentials with at least a subset of the listing of encrypted requested authentication credentials stored on the database of encrypted requested authentication credentials, the credential verification servers may determine if the requested authentication credentials are unique.

The determination of whether the requested authentication credentials are unique may be communicated by the credential verification servers to the one or more computers associated with the website or web service requesting the requested authentication credential verification. In other words, if the credential verification servers determine that the requested authentication credentials associated with the user wishing to set up an account on the website and/or web service are unique, then the credential verification servers may transmit a message to the website and/or web service, and the computers associated therewith, indicating that the requested authentication credentials are unique. Therefore, the website and/or web service and the associated one or more computers may authorize the user's requested authentication credentials and may set up an account for the user associated with those requested authentication credentials. Likewise, if the credential verification servers determine that the requested authentication credentials associated with the user wishing to set up an account on the website and/or web service are not unique, then the credential verification servers may transmit a message to the website and/or web service, and the computers associated therewith, indicating that the requested authentication credentials are not unique. As a result, the website and/or web service and the associated one or more computers may deny the user's requested authentication credentials and may not set up an account for the user associated with those requested authentication credentials. The website and/or web service, and the one or more computers associated therewith, may further notify the user, such as by visual display on a web page, that the requested authentication credentials do not comply with the guidelines of the website and/or web service for not being unique.

In certain embodiments, the credential verification servers may receive the encrypted requested authentication credential as a one-way hash of the user requested authentication credentials. In other words, the website and/or web services, and the computers associated therewith, may generate a one-way hash of user requested authentication credentials and transmit the one-way hash of the user requested authentication credentials to the credential verification servers. In one aspect, the one-way hash may be substantially non-reversible. Accordingly, the credential verification servers may not be aware of the plain text of the requested authentication credentials. Furthermore, the credential verification servers may perform a second hash of the received hash of the requested authentication credentials and store the second hash in a credential database for use in future credential verification. Therefore, a compromise of the security of the credential database associated with the credential verification servers may not result in the compromising of established user authentication credentials with the one or more websites and/or web services. Therefore, the credential verification servers may be able to assess the uniqueness of the requested user authentication credentials among a plurality of other user authentication credentials without actually having access to the plain text versions of any of the requested or other user authentication credentials. In other words, the credential verification servers may compare a second one-way hash of the received one-way hash corresponding to the requested authentication credential with a plurality of doubly hashed hashes corresponding to a plurality of authentication credentials. Based, at least in part, upon the comparison of the hashes, the credential verification server may be able to determine if the requested authentication credential is unique without having access to the plain text requested authentication credential.

Once it is determined by the credential verification server whether the requested authentication credentials are unique, the credential verification server may transmit a message indicative of whether the requested authentication credentials are unique to the requesting entity, such as the one or more computers associated with the website and/or web service requesting the verification. The message may be in the form of a data packet and may include one or more bits that indicate that the requested authentication credentials are unique or are not unique. The data packet may further include headers and/or extensions, which may include communications protocol based overhead and/or transmission integrity checks, such as parity bits and/or cyclic redundancy checks (CRC). The message, once received by the one or more computers associated with the website and/or web service may be used to make a decision by the website and/or web service on whether to accept the requested authentication credentials and/or establish a user account associated with the requested authentication credentials.

In the same or further embodiments, the credential verification server may disallow requested authentication credential verification from a particular website and/or web service, and its associated one or more computers, under certain circumstances. Such circumstances may include a situation where the number and/or frequency of verification requests from that particular website and/or web service may be greater than a predetermined threshold value. Indeed, if the number or frequency of verification requests is unusually high, it may be indicative of a malicious intent on the part of a user to use the website and/or web service to determine authentication credentials. For example, if a user selects authentication credentials and is notified of non-uniqueness of those credentials by the credential verification server, then the user may be aware that the selected authentication credentials may exist as authentication credentials to access one or more websites and/or web services. Form a practical standpoint, a user may employ automated mechanisms, such as a bot, to select authentication credentials and request those selected authentication credentials on one or more websites and/or web services, for the purposes of collecting potentially active authentication credentials. Such automated mechanisms may employ rapid and/or high frequency authentication credential verification requests to quickly identify potentially active authentication credentials. Therefore, the credential verification server may receive authentication verification requests at an unusually high frequency from a particular website and/or web service that may be used for the purpose of fraudulently acquiring potentially active authentication credentials. Such an excursion may be identified by the credential verification server, such as by identifying the request frequency and/or rate above a predetermined threshold, and may prompt the credential verification server to discontinue providing credential verification for that particular website and/or web service. In one aspect, the credential verification server may discontinue providing the authentication credential verification service for a predetermined time after the possibility of fraudulent activity has been identified.

In certain embodiments, the websites and/or web services, and/or the one or more computers associated therewith, that interact with the credential verification servers may be pre-registered with the credential verification servers to use the credential verification service. In one aspect, the credential verification servers may verify that the website and/or web service from which it receives a credential verification request is registered with the credential verification servers. The credential verification server may only perform the authentication credential verification if the requesting website and/or web service is registered with the credential verification server. In certain embodiments, websites may provide payment for the use of the credential verification service of the credential verification server. In one aspect, the payment may be any one of a flat fee per time period, such as a predetermined fee per month, a fee per each verification request, or a tiered fee structure related to the number of verifications performed by the credential verification servers. In certain embodiments, one or more websites and/or web services, and the one or more computers associated therewith, may be able to provide encrypted authentication credentials to the credential verification server for the purpose of updating the credential database associated with the credential verification server, without being able to request an authentication credential verification. In other words, the credential verification servers may accept encrypted authentication credentials from a particular website and/or web service that is not a pre-registered, affiliated, or otherwise allowed to request an authentication credential verification from the authentication verification servers. However, the credential verification servers may not provide authentication credential verification services to those websites and/or web services that are not registered with the credential verification server or otherwise do not subscribe to the credential verification services.

In certain embodiments, a website and/or web service may receive an account request from a user with an associated requested authentication credential for accessing the user account. Accounts, as used herein, may refer to any entity or mechanism by which the user's access to the functions of the website and/or web service is managed. Responsive to the account request, the website and/or web service may encrypt the requested authentication credentials, such as by performing a one-way hash, and transmit the encrypted requested authentication credentials to the credential verification server as part of an authentication credential verification request. The website and/or web service may also include contact information, such as an electronic mail (email) address or a cellular telephone number, associated with the account access requesting user in the authentication credential verification request. The credential verification server may receive the authentication credential verification request from the website and/or web service, and the one or more computers associated therewith, and may extract the encrypted requested authentication credentials and the contact information therefrom. The credential verification servers may generate a second encryption of the encrypted requested authentication credentials and may further compare the doubly encrypted requested authentication credentials to a collection of doubly encrypted authentication credentials by accessing a credential database in which the collection of doubly encrypted authentication credentials are stored. Based, at least in part, on the comparison, the credential verification servers may determine if the requested authentication credentials are unique among the collection of authentication credentials. If the credential verification servers determine that the requested authentication credentials are not unique, then the credential verification servers may transmit a message to the account requesting user using the contact information provided with the authentication credential verification request. The message to the user may indicate that the requested authentication credentials are not unique and/or may recommend to the user that the user's authentication credentials be changed. In certain embodiments, the message may further include guidelines and/or best practices in selecting secure authentication credentials.

In certain embodiments, the credential verification server may receive information from one or more websites and/or web services when a user changes a password. The information may include an encryption, such as a one-way hash, of the authentication credentials that are being changed by the user of the website and/or web service. In other words, the encrypted authentication credentials that are no longer in use by the user on the website and/or web service may be provided to the credential verification servers. Therefore, the credential verification server may be able to update the credential database based, at least in part, on the received information when the user changes his/her authentication credentials. In one case, the credential verification sever may remove the encrypted code of the old or changed authentication credentials from the credential database. In another case, the credential verification server may move and/or designate the encryption associated with the old or changed authentication credentials to indicate that those authentication credentials are no longer in use, but have been used in the past.

In further embodiments, the credential verification server may receive a credential verification request including a first hash, or other encryption associated with requested authentication credentials. The credential verification servers may extract the first hash from the received credential verification request and proceed to generate a second hash based at least in part on the first hash. The first hash and the second hash may both be similarly generated or differently generated. Both the first hash and the second hash may be, for example one-way hashes. Upon generating the second hash, the credential verification servers may compare the second hash to a collection of hashes stored on a credential database. If a match is found to the second hash, then that may be indicative of non-uniqueness of the requested authentication credentials. At that point, the credential verification servers may send a message to the web service computer associated with the requested authentication credentials to expire the requested authentication credentials. In other words, the user may have to select new authentication credentials upon attempting to login to the web service computer or access an account on the web service computer. In some cases the requested authentication credentials may be expired after a predetermined number of logins, rather than on the first login by the user to the web service computer. Therefore, when non-uniqueness of the requested authentication credentials is determined by the credential verification server is found, the requested authentication credentials may still be accepted for access to the web service computer, but may be expired shortly after the acceptance. In these embodiments, when the credential verification server finds that the second hash does not match with any of the stored hashes, indicating that the requested authentication credentials may be unique, the credential verification server may still randomly send a message to the web service computer to expire the requested authentication credentials. By randomly effectuating the expiration of requested authentication credentials that may be unique, the credential verification server may be able to prevent the web service computer from knowing with certainty which authentication credentials may be active on other web service computers associated with other web services and/or websites.

In yet further embodiments, a web service computer configured to offer a web service and/or serving a website may receive a user request for access to the web services and/or the website associated with the web service computer. As a result the user may have to establish an account with the web service computer for access using authentication credentials. At this point, the web service computer may transfer the session over to a credential verification server to complete the process of requesting authentication credentials and establishing an account associated with the requested authentication credentials. The credential verification servers may receive a requested authentication credential from a user that is trying to establish an account with the web service computer. Upon receiving the requested authentication credentials, the credential verification servers may perform a hash of the authentication credentials and compare the hash to other hashes stored on a credential database. The stored hashes may correspond to active or expired authentication credentials associated with websites and/or web services offered by more than one web service computers.

Based upon the comparison of the hash, the credential verification server may determine if the requested authentication credentials are unique among the authentication credentials associated with the hashes stored in the credential database. For example, if the credential verification server does not find a match of the hash to the stored hashes in the credential database, then the credential verification server may determine that the requested authentication credential is unique. On the other hand if a match is found, then the credential verification server may determine that the requested authentication credentials are not unique. If it is determined that the requested authentication credentials are unique, then the credential verification server may approve the requested authentication credentials and send the hash of the requested authentication credentials to the requesting web service computer. The web service computer may in the future make use of the hash to authenticate the user when the user tries to log in to his/her account with the web service computer. If it is determined that the requested authentication credentials are not unique then the credential verification server ma prompt the user to select different authentication credentials. In certain embodiments, the comparison process may be performed after performing a second hash of the first hash. By doing so, the credential verification server may transmit the first hash back to the web service computer for future authentication of the user and only store the second hash locally in the credential database. Therefore, if there is a breach of the credential database, the authentication credentials of the users associated with various web service computers may not be compromised.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing authentication credential verification may be provided. The authentication credential verification may be performed when one or more users 102 interact with at least one user device 104(1)-(N) (collectively, user devices 104) to request access to one or more websites and/or web services (as indicated by "www.domain-1.com" or "www.domain-n.org") provided by one or more web service computers 110(1)-(N) (collectively, web service computers 110) via network(s) 108. The architecture 100 may also include one or more credential verification servers 140 (referred hereinafter as credential verification servers 140) communicatively coupled to the web service computers 110 via the networks 108.

The users 102 may be individuals or other entities, such as corporations, non-profit organizations, for-profit organizations, government organizations, public sector organizations, or any of the aforementioned entities located in this or foreign countries. The user devices 104 may be any one of suitable devices that may be configured to access the web service computers via the network 108. The user device 104 may include, but is not limited to, a personal computer, a desktop computer, a notebook computer, a laptop computer, a personal digital assistant, an electronic book (ebook) reader, a tablet computing device, a pad computing device, a smart phone, or combinations thereof. The user devices 104 may include one or more user input interfaces to accept user 102 input. The user devices 104 may further include one or more network interfaces for accessing the network 108. The user devices 104 may yet further include one or more user output interfaces, such as a display, a touch sensitive display, a speaker, a haptic output, or the like. The one or more user output interfaces on the user device 104 may be used by the user 102 to interact with a website and/or web service served by the web service computers 110. In other words, the user device 104 may be able to render a web site and/or other web service served by the web service computers 110. For example, the user devices 104 may be configured to run instructions, such as an application program stored on one or more memories of the user device 104, on one or more processors of the user devices 104 to display one or more websites and/or web services on the display of the user devices 104. In some cases, the user devices 104 may be "intelligent devices" that may execute one or more programs and user applications locally on a processor. In other cases, the user devices 104 may be "dumb terminals" configured to primarily execute software, programs, or user applications related to serving, displaying, or otherwise rendering information or content provided from sources external to the user device 104, such as from the web service computers 110. Indeed, the architecture 100 may include both "intelligent devices" and "dumb terminals."

In certain aspects, the websites, with constituent web pages and/or web services provided by the web service computers 110 may be services that have the web service computers 110 identify the user 102 that is interacting with the web service computers 110 using the user device 104 via the networks 108. In further aspects, the web service computers 110 may provide unique access and/or unique content to each of the users 102 that access websites and/or web services served by the web service computers 110. To render the unique access and/or unique content to each user 102 of the web pages and/or web services provided by the web service computers 110, the web service computers may require authentication credentials from a user 102 to uniquely identify the user. In other words, the web service computers 110 may have memories storing instructions and/or programs thereon and when the instructions and/or programs are executed by one or more processors of the web service computers 110, the web service computers 110 may be able to verify the identity of a user 102 that attempts to access the web pages or use the web services provided by the web service computers 110. The web service computers 110 may, therefore, include any computer(s) or server(s), including hardware and software, which are configured to provide Internet-based websites including one or more web pages, including those websites requiring access codes or login credentials. In fact, other computers within architecture 100 may function as web service computers 110 in addition to providing any other functionality discussed herein. It should be understood that any functionality described herein may generally be provided by any of these devices and/or computers described.

The web sites and/or web services offered by the web service computers 110 may include any variety of suitable web sites and/or web services. The web sites and/or web services may include, but are not limited by, social networking services and/or accounts, electronic mail (email) services and/or accounts, online retailing and/or purchasing accounts, online media downloading and/or streaming services, online access to financial products, online access to remote control products, or combinations thereof. Some examples of social networking services and/or accounts may include Twitter®, Facebook®, MySpace®, LinkedIn®, Bebo®, Google+®, Orkut®, RenRen®, or the like. Some examples of email services and/or accounts may include Yahoo.com®, Gmail.com®, Hotmail.com®, or the like. Some examples of online retailing accounts may include accounts at internet domains including, Amazon.com®, Ebay.com®, Craigslist.com®, Walmart.com® or the like. Some examples of online media downloading and/or streaming may include services from internet domains including, Amazon.com®, itunes.com®, Netflix.com®, Hulu.com®, or the like. Some examples of online access to financial products or services may include secure online access to credit card accounts, banking accounts, bill payment accounts, biller accounts, mortgage accounts, debt accounts, debit card accounts, pre-paid card accounts, or the like. Some examples of online access to remote control products may include remote access to home security systems, home appliances, intelligent meters, cellular telephone and/or smart phone accounts, automobiles, or the like.

Authentication credentials, as used herein may include any variety of text, data, images, sounds, or the like, that may be provided by the user 102 to verify his/her identity to one or more web services and/or websites served by the web service computers 110 or other entities on behalf of the web service computers 110. In certain embodiments, the authentication credentials may include a login, in combination with a password. In one aspect, each of the login and the password may be text strings. Alternatively, the login and password may be an image and/or sound, or a signal representation thereof. In certain other embodiments, the authentication credentials may include a login and password, along with one or more of a sound, image, personal data, and/or biometric data. Therefore, the authentication credentials may include any number of elements that may uniquely identify a particular user 102 to the web service computers 110. As a non-limiting example, the authentication credentials may include a login and a password, and may require the user 102 to identify a particular image from a plurality of images. In this case, the plurality of image choices may be served by the web service computers 110 and rendered via the user device 104. As another non-limiting example, the authentication credentials may include a login and a password and an image that is uploaded from the user device 104. In one aspect, the image may be stored locally on the user device 104. In another aspect, the image may be collected by an image sensor on the user device 104. For example, the image may be of the user's face and the image may be used to ascertain if the user's face is displayed for the purposes of authentication. Similarly, the authentication credentials may include a login and a password, and may require the user 102 to identify a particular sound from a plurality of sounds. In this case, the plurality of sound choices may be served by the web service computers 110 and rendered via the user device 104. As another non-limiting example, the authentication credentials may include a login and a password and a sound that is uploaded from the user's user device 104. In one aspect, the sound may be stored locally on the user device 104. In another aspect, the sound may be collected by a microphone on the user device 104 based on sound generated by the user 102. The sound may be a secret word or a secret pass-phrase. Additionally, the sound may be used for biometric purposes, such as for voice recognition based authentication. Further, personal information may be an element in the authentication credentials, including, but not limited to identifying a birthdate, or portions thereof, mother's maiden name, birth city, best friend, address, town where one grew up, name of one's first pet, father's middle name, child's birthdate, or portions thereof, child's name, or the like. Further still, biometric information, such as face recognition, object recognition, voice recognition, fingerprint recognition, retina recognition, or the like may be used for authentication purposes and, therefore, may be included with the authentication credentials.

The networks 108 may include any one or a combination of different types of suitable communications networks, such as cable networks, the Internet, wireless networks, cellular networks, and other private and/or public networks. Furthermore the networks 108 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing a website and/or web service over the networks 108, the described techniques may equally apply in instances where the users 102 interact with the web service computers 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored software applications, etc.).

The architecture 100 may further include one or more credential verification servers 140 (herein referred to as credential verification servers 140). The credential verification servers 140 may be any type of computing devices such as, but not limited to, mobile, desktop, thin-client, server, remote computing, and/or cloud computing devices. In some examples, the credential verification servers 140 may be in communication with the one or more web service computers 110, user devices 104, and/or social networking computers 114 via the networks 108, or via other network connections. In certain embodiments, the credential verification servers 140 may include one or more servers, perhaps arranged in a cluster, as a server farm, or as individual servers not associated with one another. These credential verification servers 140 may be configured to receive, store, and/or process information associated with requested authorization credentials for access to websites and/or web services offered by the web service computers 110. The credential verification servers 140 may be further configured to determine, based at least in part on received information associated with requested authentication credentials, if the requested authentication credentials are unique among accounts established or requested at one or more of websites and/or web services provided by the web service computers 110. In this case the received information associated with the requested authentication credentials may be, for example, an encrypted representation of the authentication credential, or portions thereof. In some cases, the encryption may include a one-way hash of the requested authentication credential. In addition, the credential verification servers 140 may be configured to enforce unique authentication credentials among one or more websites and/or web services provided by the web service computers 110. Yet further, the credential verification servers 140 may be configured to store authentication credentials, or information associated therewith and/or indications thereof, associated with websites and/or web services provided by the web service computers 110. In certain further embodiments, the authentication verification servers 140 may be further configured to keep track of currently active authentication credentials, or information associated therewith and/or indications thereof. In these embodiments, the authentication verification servers 140 may be configured to receive information related to authentication verification credentials that have been changed or are no longer active and update a credential database of currently active authentication credentials, or indications thereof.

In one illustrative configuration, the credential verification servers 140 may include one or more processing units (or processor(s)) 144 and at least one memory 170. In some examples, the processor(s) 144 of the credential verification servers 140 may be implemented as appropriate in hardware, software, firmware, or combinations thereof. Software or firmware implementations of the processor(s) 144 may include computer-executable or machine-executable instructions written in any suitable programming language to perform the various functions described. Hardware implementations of the processor(s) 144 may be configured to execute computer-executable or machine-executable instructions to perform the various functions described.

The memory 170 may store program instructions that are loadable and executable on the processor(s) 144, as well as data generated or received during the execution of these programs. Depending on the configuration and type of credential verification servers 140, the memory 170 may be volatile (such as random access memory (RAM)) and/or non-volatile (such as read-only memory (ROM), flash memory, etc.).

The credential verification servers 140 may also include input/output (I/O) device(s) 146, such as a keyboard, a mouse, a pen, a voice input device, a touch input device, a display, speakers, a printer, etc. The credential verification servers 140 may also include communications connection(s) 148 that allow the credential verification servers 140 to communicate with stored databases, other computing devices or servers, user terminals, and/or other devices on the networks 108. The credential verification servers 140 may further include one or more storage device drivers 150 to enable communications with one or more external storage devices and/or databases, such as a credential storage database 180 as illustrated.

Turning to the contents of the memory 170 in more detail, the memory 170 may include an operating system 172, one or more application programs or services 174 for implementing the features disclosed herein, a credential verification module 176, and/or a credential management module 178. Each of the modules and/or software may provide functionality for the credential verification servers 140, when executed by the processors 144. The modules and/or the software may or may not correspond to physical locations and/or addresses in memory 170. In other words, the contents of each of the modules may not be segregated from each other and may, in fact be stored in at least partially interleaved positions on the memory 170.

The operating system module 172 may have one or more operating systems stored thereon. The processors 144 may be configured to access and execute one or more operating systems stored in the operating system module 172 to operate the system functions of the credential verification servers 140. System functions, as managed by the operating system may include memory management, processor resource management, driver management, application software management, system configuration, and the like. The operating system may be any variety of suitable operating systems including, but not limited to, Microsoft® Windows®, Microsoft® Windows® Server®, Linux, Apple® OS-X®, or the like.

The applications module 174 may include any variety of application software that may be executed in conjunction with the operating system that the processor 144 may be utilizing for the credential verification servers 140. The applications module 174 may include any variety of software that may be utilized for any purpose. For example, the applications module 174 may include, but not be limited to, drawing programs, image processing programs, audio processing programs, word processing, spreadsheet programs, database management programs, enterprise resource planning programs, presentation programs, personal finance programs, tax preparation programs, accounting programs, statistical analysis programs, computer-aided manufacturing programs, computer-aided design programs, games and entertainment programs, educational programs, web viewers, or combinations thereof. The applications 174 may be accessed by users 102 interacting directly with the credential verification servers 140 or interacting remotely via the network 108. The applications may further include instructions or programs to verify and/or enforce unique authentication credentials associated with the web service computers 110.

The credential verification module 176 may have stored thereon instruction and/or programs that when executed by the processors 144, may enable the credential verification servers 140 to receive an authentication credential verification request that may include requested authentication credentials and/or information associated with the credentials, or portions thereof, via any suitable mechanism, such as via the network 108. Information associated with the requested authentication credentials may be an encryption of the elements of the requested authentication credentials. In one non-limiting example, the information associated with the requested authentication credentials may include a one-way hash of both of a login and password of an authentication credential. In another non-limiting example, the information associated with the requested authentication credentials may include one-way hash of the login and another one-way hash of the password associated with the requested authentication credentials. The information associated with the requested authentication credentials may further include other elements of the authentication credentials or may include particular metadata. For example the metadata may include, but is not limited to, an Internet Protocol (IP) address of the user device 104 from which the requested authentication credentials were requested, the IP address of the web service computer 110 from which the requested authentication credentials are received, an identifier of the website (e.g., a Uniform Resource Locator (URL)) associated with the web service computer 110 from where the requested authentication credential is received, a time associated with the requested authentication credentials, or the like.

The processors 144, by executing instructions and/or programs stored in the credential verification module 176 may be further configured to extract elements and/or portions of a received credential verification request to identify relevant information, such as information associated with requested authentication credentials, such as a one-way hash of the requested authentication credentials. The mechanisms used may include parsing of one or more data packets using which the authentication credential verification request was transmitted by the web service computers 110 and received by the credential verification servers 140. The credential verification module 176 may further include instructions and/or programs when executed by the processors 144, enable the credential verification servers 140 to verify if the credential verification request was transmitted without error, based at least in part on, for example, one or more parity bits and or cyclic redundancy checks that may be included in one or more data packets used to communicate the credential verification request to the credential verification servers 140.

Based on instructions and/or programs stored in the credential verification module 176, the processors 144 of the credential verification servers 140 may be further configured to compare information associated with a requested authentication credential from to a plurality of information, where each information element may be associated with a corresponding authentication credential. In one aspect, the plurality of information may be associated with a plurality of authentication credentials that are currently in use and/or were at one time in use by one or more websites and/or web services provided by the web service computers 110. For example, the processors 144 may be configured to receive a one-way hash of a requested login and password and may compare the received one-way hash corresponding to the requested login and password, to a plurality of one-way hashes, where each of the plurality of one-way hashes correspond to a respective login and password combination. As another example, the processors 144 may be configured to receive a one-way hash of a requested login and password and may perfroma a second one-way hash and compare the second one-way hash corresponding to the requested login and password, to a plurality of one-way hashes, where each of the plurality of one-way hashes correspond to a respective login and password combination. In this case, the plurality of one-way hashes may be also be one-way hashes of one-way hashes. The plurality of one-way hashes may indeed correspond to authentication credentials for more than one website and/or web service provided by the web service computers 110. In certain embodiments, the plurality of one-way hashes may be associated with requested authentication credentials that were previously verified to be unique among the plurality of authentication credentials by credential verification servers 140.

In the same or additional embodiments, the plurality of one-way hashes may correspond to both currently active, as well as previously used authentication credentials across multiple websites and/or web services provided by the web service computers 110. Alternatively, the plurality of one way-hashes may correspond to only currently active authentication credentials across multiple websites and/or web services provided by the web service computers 110. Therefore, in certain cases the credential verification servers 140 may have access to information pertaining to both active and inactive authentication credentials and in other cases the credential verification servers 140 may have access to information pertaining to only active authentication credentials. In certain embodiments, the credential verification servers 140 may receive information pertaining only to requested and/or new authentication credentials from the web service computers 110. In other cases, the credential verification servers 140 may receive both information associated with requested and/or new authentication credentials, as well as authentication credentials that are subsequently deactivated or changed by the corresponding user 102 or the web service computers 110. In certain embodiments, the credential verification servers 140 may receive information related to authentication credentials from only web service computers 110 that are authorized to receive authentication verification services from the credential verification servers 140. These web service computers 110 may be pre-authorized to use the verification service or may subscribe to the service upon payment of fees associated with the use of the verification services offered by the credential verification servers 140. It will be appreciated that the web service computers 110 may be affiliated with the credential verification servers in a variety of ways. Several of these affiliations may encompass various mechanisms for payment for the authentication credentials verification services rendered by the credential verification servers 140. In other embodiments, the credential verification servers 140 may receive information related to authentication credentials from web service computers 110 that are affiliated with and unaffiliated with the credential verification servers 140. Regardless of whether a particular web service computer 110 pays for or otherwise uses the services provided by the credential verification servers, there may be a mutual benefit for both the unaffiliated web service computer 110, as well as the credential verification servers 140, if authentication credential information is shared between the two. By doing so, the credential verification servers 140 may be able to provide verification results that verify across a wider array of web services and/or websites provided by a greater number of web service computers 110. Furthermore, the unaffiliated web service computers 110 and associated websites and/or web services may also benefit, as there may be a greater likelihood that authentication credentials associated with the unaffiliated web service computers 110 are unique, since other web service computers 110 that are affiliated with the credential verification servers 140 may be prevented from using the same authentication credentials for its users 102. In effect, this may make authentication credentials of the unaffiliated web service computers 110 more secure.

The instructions and/or programs stored on the verification module 176 may, therefore, enable the processors 144 to determine if authentication credentials associated with a received authentication credential verification request, such as user 102 requested authentication credentials are unique among a set of authentication credentials, or information associated therewith, available to the credential verification servers 140. It will be appreciated that in certain embodiments, the credential verification servers 140 may be able to communicate an indication of whether the authentication credentials associated with the credential verification request are unique among the authentication credential information available to the credential verification servers 140 to the web service computers 110. In the same or other embodiments, the credential verification servers 140 may be able to communicate an indication of whether the authentication credentials associated with the credential verification request are unique to the user 102 using contact information, such as an email address or text message phone number. Furthermore, the credential verification servers may request the user 102 to change the authentication credential request to one that is deemed unique by the credential verification servers 140.

The credential verification module 176 may further include instructions and/or programs that may be executed by the processors 144 to monitor if the frequency of credential verification requests from a particular website and/or web service associated with a particular web service computers 110(1)-(N) is abnormal or outside of a predetermined threshold level. For example the processors 144 may be configured to determine if the number of received requests during a particular period of time is beyond a predetermined upper bound threshold level. This type of high frequency verification checks from a particular website and/or web service and the associated web service computers 110 may be indicative of fraudulent or malicious behavior to determine established authentication credentials.

Based on instructions and/or programs stored in the credential verification module 176, the processors 144 of the credential verification servers 140 may be further configured to perform a second hash on a hash that may be received with a credential verification request. In other words, the processors 144 may be configured to extract the first hash associated with requested authentication credentials from a credential verification request and then perform a second hash on that extracted hash. The second hash, in certain embodiments, may be compared to other double hashes corresponding to active or expired authentication credentials to determine the uniqueness of the requested authentication credentials.

The credential management module 178 may have instructions and or programs stored thereon that may be executed by the processors 144 of the credential verification servers 140 to receive information associated with authentication credentials, or portions thereof, and store and/or manage the information on the memory and/or the credential database 180. Therefore, the credential management module 178 and instructions stored thereon may be utilized for storage of authentication credential related information, such as encrypted authentication credentials and/or user related information, on the credential database. In certain embodiments, the authentication credential information and/or other information that may have been extracted from one or more data packets that constitute the credential verification request received by the credential verification servers 140 using the instructions and/or programs stored on the credential verification module 176 may be passed to the instructions and/or programs associated with the credential management module 178 for storage on the credential database 180. In certain embodiments, the credential management module 178, and the processes and instructions stored thereon, may have a second encryption of the requested authentication credentials, as performed by the processors 144 of the credential verification servers 140 passed on to it. In cases where indications of changed or old credentials are received by the credential verification servers 140, the instructions and/or programs stored on the credential management module 178 may be utilized to update the credential database by indicating old or unused authentication credentials, or associated information, and/or portions thereof. The credential management module 178 may further include instructions and/or programs that may be executed by the processors 144 to receive and store one or more user related information associated with a user requested authentication credential for the establishment of a user account on the web service computers 110. In other words, the processors 144 may be configured to store information associated with a request of an authentication credential that is to be verified for uniqueness, along with any user information provided with the corresponding respective credential verification request. The user information may include, for example, an email address, a phone number, a text message address, a mailing address, a facsimile number, or combinations thereof. Additionally, instructions and/or programs stored on the credential management module 178 may be executed by the processors 144 to retrieve credential related information from the credential database, such as for the purposes of authentication credential verification.

It will be appreciated that there may be overlap in the functionality of the instructions stored in the credential verification module 176 and the credential management module 178. In fact, the functions of the credential verification module 176 and the credential management module 178 may interact and cooperate seamlessly under the framework of the credential verification servers 140. Indeed, each of the functions described for either module 176, 178 may be stored in either module 176, 178 in accordance with certain embodiments of the disclosure. Further, in certain embodiments, there may be one single module that includes the instructions, programs, and/or applications described within the credential verification module 176 and the credential management module 178.

The credential database 180 may include removable storage and/or non-removable storage. The credential database 180 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 170 may include multiple different types of memory, such as static random access memory (SRAM), dynamic random access memory (DRAM), and/or ROM.

The memory 170 and/or the credential database 180, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

The web service computers 110 may be accessed by a user 102 via a respective corresponding user device 104 to establish an account and/or profile with the web service computers 110 to access websites and/or web services provided to by the web service computers 110. In the process of setting up user access to the websites and/or web services, the web service computers 110 may request the user 102 to establish authentication credentials for future secure access to the user account and/or profile on the web service computers 110. Responsive to the request to establish authentication request, the user 102 may request authentication credentials. In this case, the authentication credentials may be, for example a login and password. The login and password may be, for example, text strings that may uniquely identify the user's account and/or profile among all the user accounts with that web service computer 110. As described above, the authentication credentials may not be limited to a login and password. Indeed, the authentication credentials may include any combinations of login(s), password(s), personal datum/data, biometric datum/data, image(s), or sound(s).

Upon receiving the requested authentication credentials, the web service computers 110 may begin a process of determining if the requested authentication credentials may be established as authentication credentials for the user 102 to access the services and/or websites provided by the web service computers 110. For example, the determination may be based, at least in part, on if the requested authentication credentials are unique among the users 102 of websites and/or web services provided by that particular web service computer 110. In other words, the web service computer 110 may compare the requested authentication credentials to one or more authentication credentials that are, or have been, used to access websites and/or web services provided by that web service computer 110. If the authentication credentials are unique, then the web service computers may establish the requested authentication credentials for enabling access to the user 102. The process of determining if the requested authentication credentials should be established as access authentication credentials for the user 102 may further include determining if the authentication credentials meet a minimum level of complexity. For example, the web service computer 110 may assess if the login and/or the password has a minimum threshold level of characters, or a minimum mix of alphabetic, numeric, upper and/or lower case, or symbolic text. Indeed, it will be apparent that the web service computers 110 may evaluate a variety of factors associated with the requested authentication credentials. One factor that the web service computers may use in determining if the requested authentication credentials should be established as authentication credentials for allowing user 102 access may be a determination of whether the authentication credentials are unique among multiple other web service computers 110. The methods described herein provide various mechanisms for determining if requested authentication credentials are unique across multiple web service computers 110.

Figure 2:
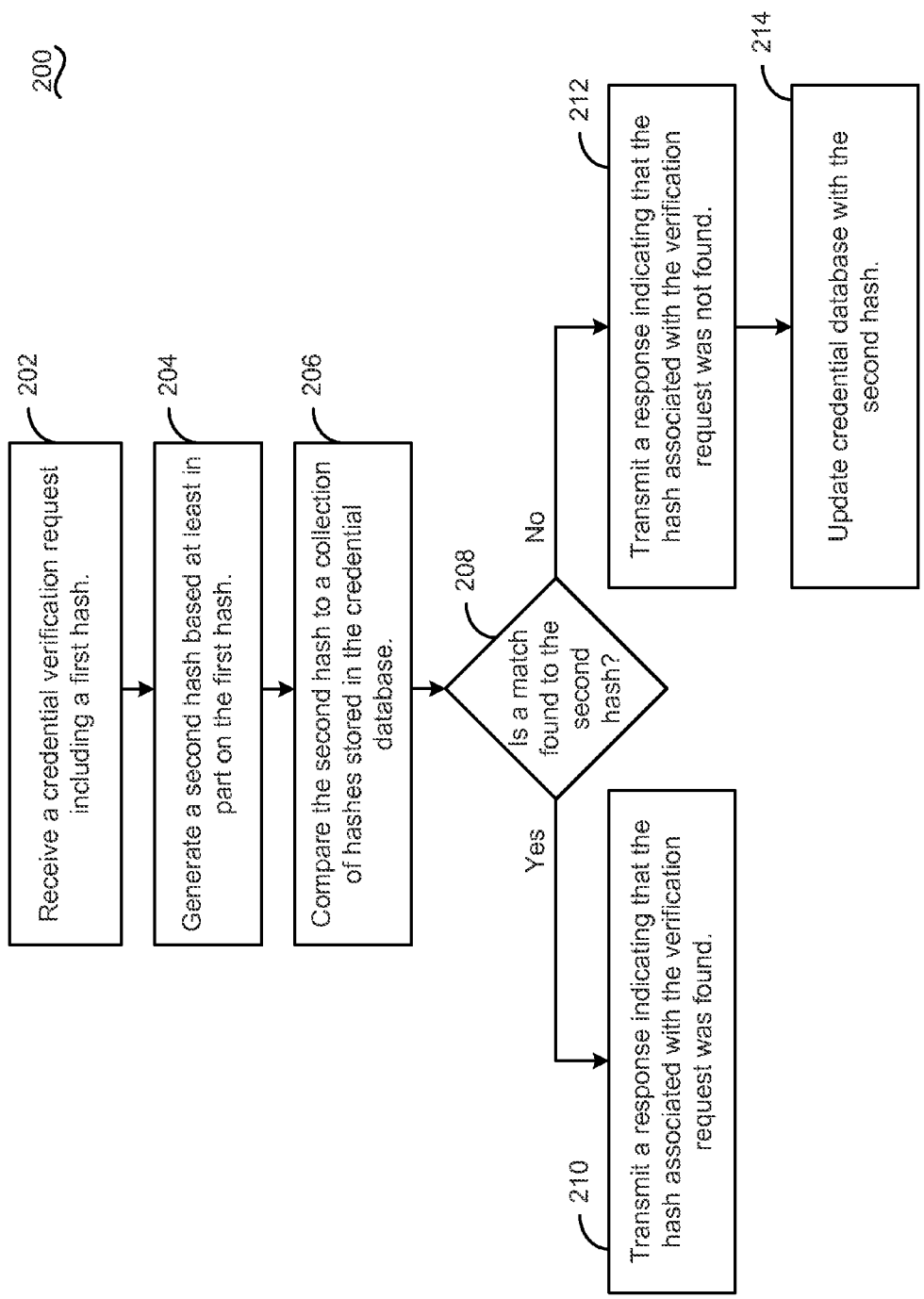
FIG. 2 illustrates a flow diagram representing an example method for enforcing unique authentication credentials, in accordance with embodiments of the disclosure.

Referring now to FIG. 2, an example method 200 for verifying a requested authentication credential in accordance with embodiments of the disclosure is discussed. The method 200 may be implemented by the credential verification servers 140. At block 202, a credential verification request that includes a first hash may be received. The credential verification request may be transmitted by the web service computers 110 via the networks 108 to the credential verification servers 140.

The credential verification request may be generated by the web service computer 110 to request the credential verification servers 140 to perform uniqueness verification on the requested authentication credentials. In one aspect, the credential verification request may include the first hash of the requested authentication credentials. The credential verification request, in certain embodiments, may further include additional information, such as identifiers of the user 102, contact information associated with the user 102, an identifier of the user device 104 or location from where the authentication credentials are requested, or the like. The credential verification request may be generated in the form of one or more data packets configured to be transmitted via the networks 108. The one or more data packets may include header information, such as routing information, transmission protocol information, destination information, or the like. The one or more data packets may further include extension information, such as parity check bit(s), CRC bit(s) or other transmission quality check information.

The first hash may be a one-way hash of a requested authentication credential. As such, the first hash may be, from a practical standpoint, irreversible. Therefore, in this case, the credential verification server 140 may not be able to ascertain the original requested authentication credential from the received credential verification request or the first hash contained therein. In effect, this enables the credential verification servers to ascertain the uniqueness of a particular requested authentication credential without "knowing" the original authentication credential. Therefore, the owners of the web service computers 110 and the websites and/or web services associated therewith, may have some level of confidence that they can verify the uniqueness of requested authentication credentials without compromising the security of those authentication credentials or providing those credentials to a third party entity.

It will be appreciated that instead of a hash, any type of information, including other types of encryption, related to the requested authentication credential may be transmitted to the credential verification servers 140. Any variety of suitable hashes and/or algorithms may be employed to encrypt the requested authentication credentials.

In certain embodiments, the mechanisms described herein may be employed in a manner where elements of the requested authentication credentials are individually encrypted and provided separately. For example, consider an example where the requested authentication credentials include a textual login and a textual password. The credential verification request associated with the requested authentication credentials may include a one-way hash of the login and a one-way hash of the password.

At block 204, the received first hash may be hashed again to generate a second hash corresponding to the first hash and the requested authentication credentials. The second hash may be performed by the processors 144 of the credential verification servers 140. In certain embodiments, the second hash may be a second one-way hash of the one-way hash of the requested authentication credentials. Indeed, the same or different hash algorithms may be used to generate the second hash as is used for generating the first hash of the requested authentication credentials by the web service computer 110. As described above, the processors 144 may execute instructions, applications, and/or programs stored in the credential verification module 176 and/or the credential management module 178 to perform the second hash of the first hash. The processors 144 may extract the hash associated with the requested authentication credentials from the received credential verification request. The extraction may be performed by parsing the one or more data packets used to transmit the credential verification request.

At block 206, the second hash may be compared to a collection of hashes stored in the credential database. As described above, the processors 144 may execute instructions, applications, and/or programs stored in the credential verification module 176 and/or the credential management module 178 to perform the comparison. The processors 144 may access the hashes associated with previously verified authentication credentials, currently active authentication credentials, and/or previously active authentication credentials from the credential database 180. These stored hashes may also be doubly hashed authentication credentials. The processors 144 may next compare the second hash corresponding to the requested authentication credentials to the hashes accessed from the credential database 180. The comparison may be performed by comparing alphanumeric, hexadecimal, and/or binary symbols associated with the hash corresponding to the requested authentication credentials to each of the collection of stored hashes. Various algorithms may be employed to perform fast comparisons. These algorithms may include techniques such as partial symbol comparisons, as well as optimized database management to preferentially order the comparisons.

Still referring to FIG. 2, at block 208, it may be determined if any of the hashes in the collection of stored hashes matched the second hash associated with the requested authentication credentials. If a match is found at block 208, then at block 210, a response may be transmitted indicating that the hash associated with the verification request was found. The response may be in the form of one or more data packets that include at least one bit that indicates that the hash associated with the verification request is not unique among the universe of hashes available to the credential verification servers 140. The indication of non-uniqueness of the requested authentication credentials may be received by the web service computer 110 requesting the verification and may be used to deny the establishment of the requested authentication credentials.

At block 208, if it is determined that a match is not found, then, at block 212, a response may be transmitted indicating that the hash associated with the verification request was not found among the universe of hashes available to the credential verification servers 140. The response may be in the form of one or more data packets that include at least one bit that indicates that the hash associated with the verification request is unique among the universe of hashes available to the credential verification servers 140. The indication of uniqueness of the requested authentication credentials may be received by the web service computer 110 requesting the verification and may be used to approve or accept the establishment of the requested authentication credentials.

At block 214, the credential database may be updated with the second hash associated with the requested authentication credential. The update may be performed by the processors 144 executing instructions and/or applications stored in the credential management module 178. In certain embodiments, the updating of the credential database 180 may be performed in a manner to organize the hashes in an order that is most likely to be matched during future authentication credential verifications.

It should be noted, that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure.

Figure 3:
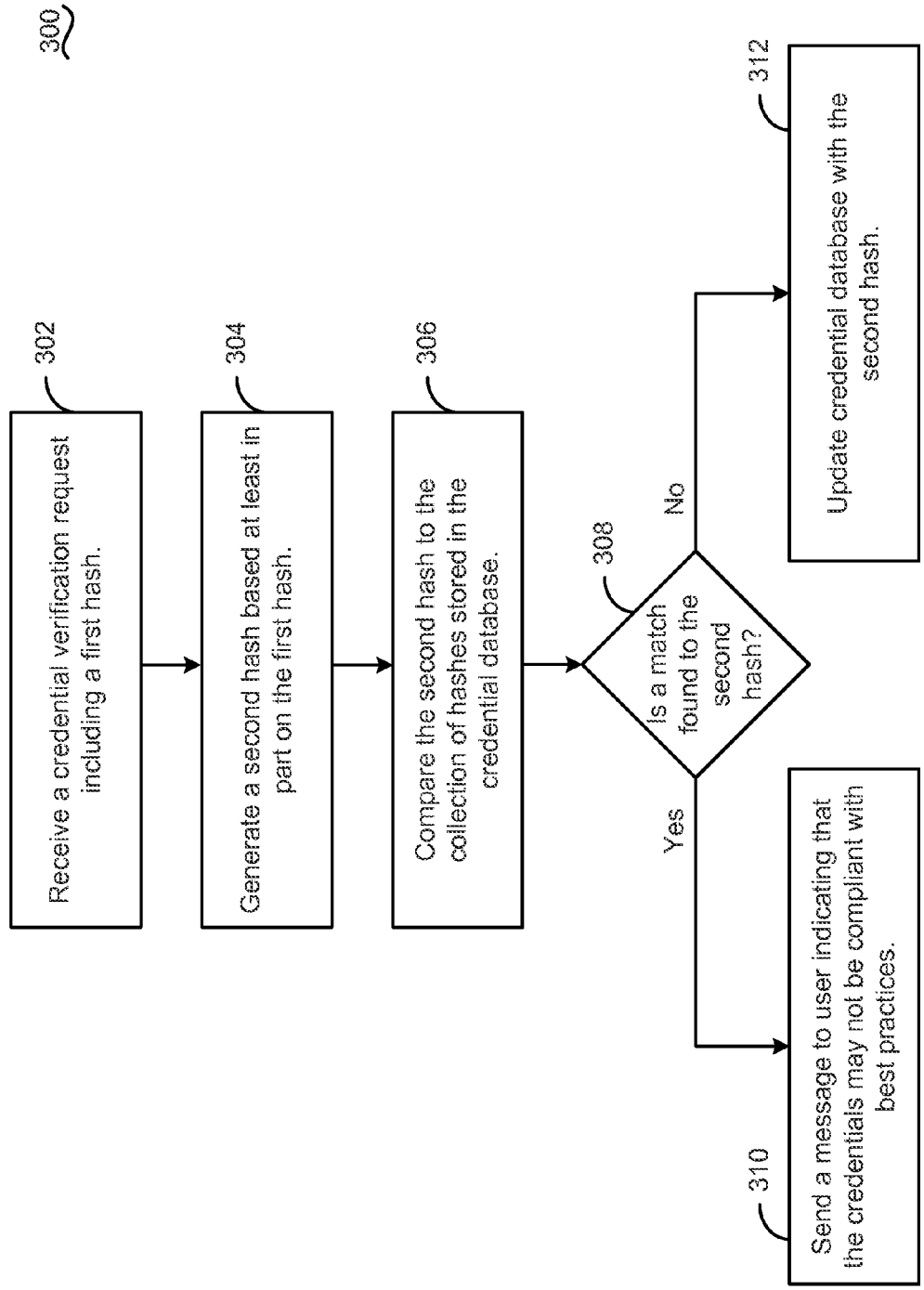
FIG. 3 illustrates another flow diagram representing an example method for enforcing unique authentication credentials, in accordance with embodiments of the disclosure.

Referring now to FIG. 3, an example method 300 of verifying the uniqueness of authentication credentials according to embodiments of the disclosure is illustrated. At lock 302, a credential verification request may be received. The credential verification servers 140 may receive the credential verification request. As described above in conjunction with method 200 of FIG. 2, the credential verification request may include information associated with a user requested set of authentications credentials, such as a one-way hash of the requested authentication credentials. In these embodiments, the credential verification request may further include contact information of the user 102 associated with the requested authentication request. The contact information may include, for example, at least one of an email address, a phone number, a mobile number, a text message number, a facsimile number, and/or an address. At block 304 a second hash may be generated based at least in part on the first hash associated with the requested authentication credentials. At block 306, the hash may be compared to a collection of hashes stored in the credential database. The mechanism for the generation of the second hash and comparison is similar to that discussed with reference to method 200 of FIG. 2 and in the interest of brevity, will not be discussed here.

At block 308, it may be determined if there is a match found to the second hash associated with the requested authentication credentials. If a match to the second hash associated with the requested authentication credentials is found by the processors 144 of the credential verification servers 140 among the hashes available to the credential verification servers 140, then, at block 310, a message may be transmitted to the user indicating that the requested credentials are not compliant with best practices or not in compliance with a compliance policy. The message may further include a suggestion and/or instructions to change the authentication credentials. The message may yet further provide instructions on how to change the authentication credentials. If, at block 308, it is determined that the second hash corresponding to the requested authentication request is unique, then, at block 312, the authentication credential database may be updated. The updating of the credential database 180 may be similar to the mechanism described above in conjunction with method 200 of FIG. 2.

Figure 4:
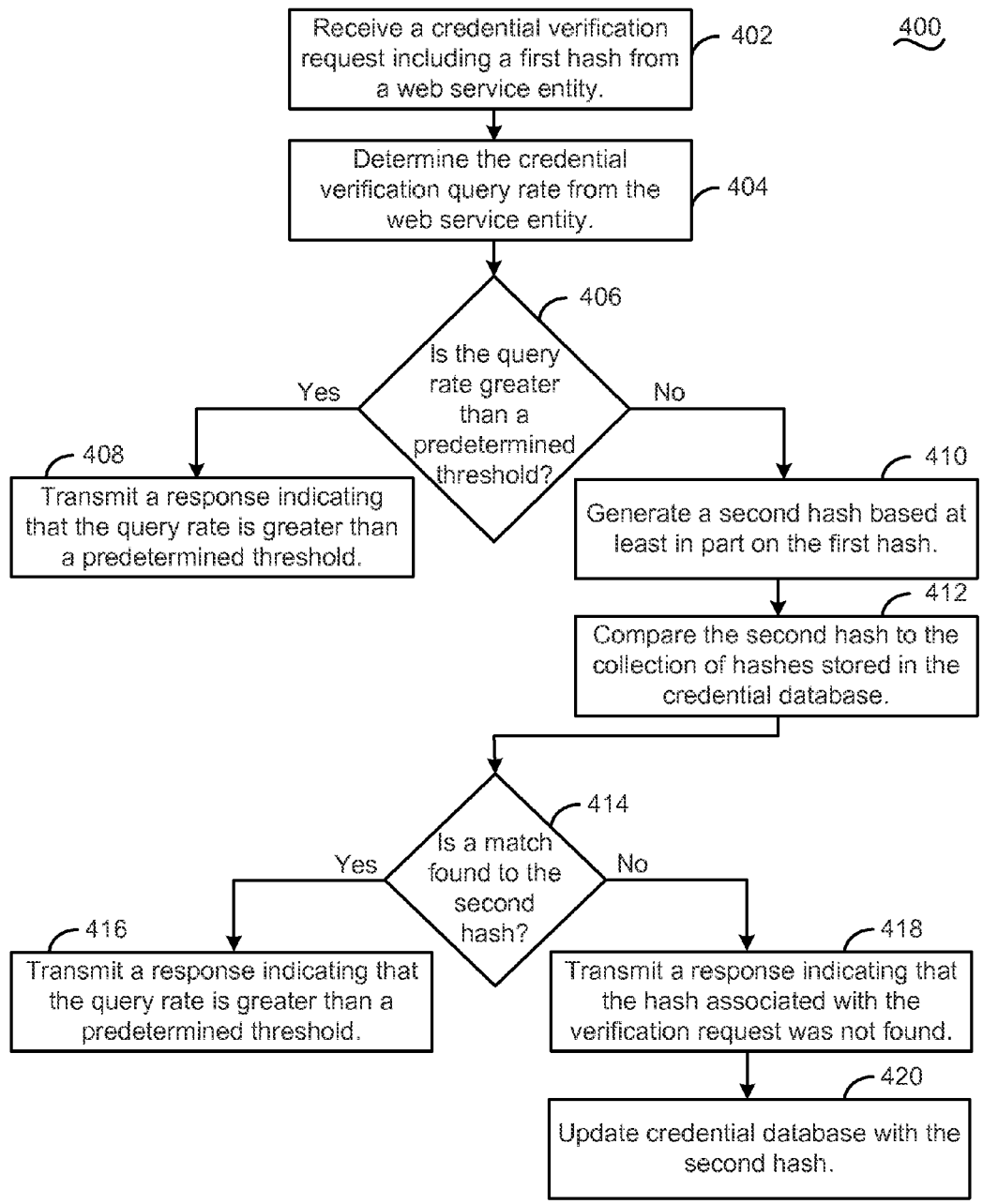
FIG. 4 illustrates a flow diagram representing an example method for verifying the uniqueness of authentication credentials, in accordance with embodiments of the disclosure.

Referring now to FIG. 4, an example method 400 for verifying the uniqueness of authentication credentials while providing safeguards for detecting and preventing fraudulent activities is illustrated. At block 402, a credential verification request that includes a hash may be received. The credential verification request may include, in addition to the hash, information that identifies the requesting web service computer. Therefore, when the credential verification servers 140 and the associated processors 144 receive the credential verification request, the processors may ascertain from the received request, which web service computer 110 is making the request. Ascertaining this information may involve analyzing, by the processors 144, one or more data packets associated with the credential verification request. Such analysis may involve parsing the bits of the one or more data packets to extract the indication of the identity of the web service computers 110 making the credential verification request. The identity may, in certain embodiments, be in the form of an internet protocol (IP) address.

At block 404, the query rate from the particular web service computer may be determined. The query rate may be determined by storing, by the processors, the identity of the requesting web service computers 110 over a predetermined period of time and/or predetermined number of verification requests. This data may be stored, for example, on the memory 170 or the credential database 180. The requesting web service computer data may be accessed to determine the number of times over a predetermined time period that the requesting web service computer 110 has made a request for authentication credential verification to the credential verification servers 140. The query rate may, therefore, be determined and updated in real-time or near real-time as credential verification requests are received by the credential verification servers 140.

At block 406, it may be determined if the query rate is greater than a predetermined threshold. If the query rate is abnormally high, it may be an indication of malicious or fraudulent behavior. For example, an unusually high query rate may indicate that automated mechanisms, such as bots, may possibly be trying to determine authentication credentials on a particular web service computer 110. The bot may be trying various requested authentication credentials and repeating the requests to detect one or more authentication credentials that are not allowed. When the authentication credential is not allowed, it may be an indication that that authentication credential exists as a valid authentication credential on that or another web service computer 110 or associated websites and/or web services. Accordingly, detecting query rates higher than a predetermined threshold may be one way to detect such fraudulent behavior.

If at block 406 it is determined that the query rate is greater than the predetermined threshold, then, at block 408 a response indicating that the query rate is greater than a predetermined threshold may be transmitted. The response may be generated by the processors 144, transmitted by the credential verification servers 140, and received by the web service computer 110 that made the credential verification request of block 402. Therefore, the credential verification servers 140 may temporarily halt providing the credential verification service to the web service computer 110 when the credential verification servers 140 detect potentially fraudulent or malicious activity associated with that web service computer 110. The web service computer 110 may further investigate potential fraudulent behavior based on the received response from the credential verification servers 140.

If at block 406, the query rates not found to be greater than the predetermined threshold, then the method 400 may proceed in a similar fashion as method 200, where, at block 410, a second hash may be generated based at least in part on the first hash and, at block 412, the second hash may be compared to hashes stored in the credential database. Then at block 414, it may be determined if a match was found. At 414, if a match was found, then at block 416, a message may be transmitted that indicates that a match to the hash associated with the verification request was found. At block 414, if a match was not found, then, at block 418, a message indicating that a match to the hash associated with the requested authentication credentials was not found. At block 420, the credential database may be updated with the hash associated with the requested authentication credentials. Blocks 410, 412, 414, 416, 418, and 420 are similar to blocks 204, 206, 208, 210, 212, and 214 of FIG. 2, respectively, and, in the interest of brevity, a full description of each of these processes will not be repeated here.

It will be appreciated that method 400 may provide a mechanism for a web service computer 110 to verify the uniqueness of a request authentication credential without providing the original requested authentication credential to a third party system. In addition, the method 400 provides for safeguards against potential threats arising from exploitation of the systems and methods disclosed herein to engage in fraudulently acquiring sensitive authentication credentials.

Figure 5:
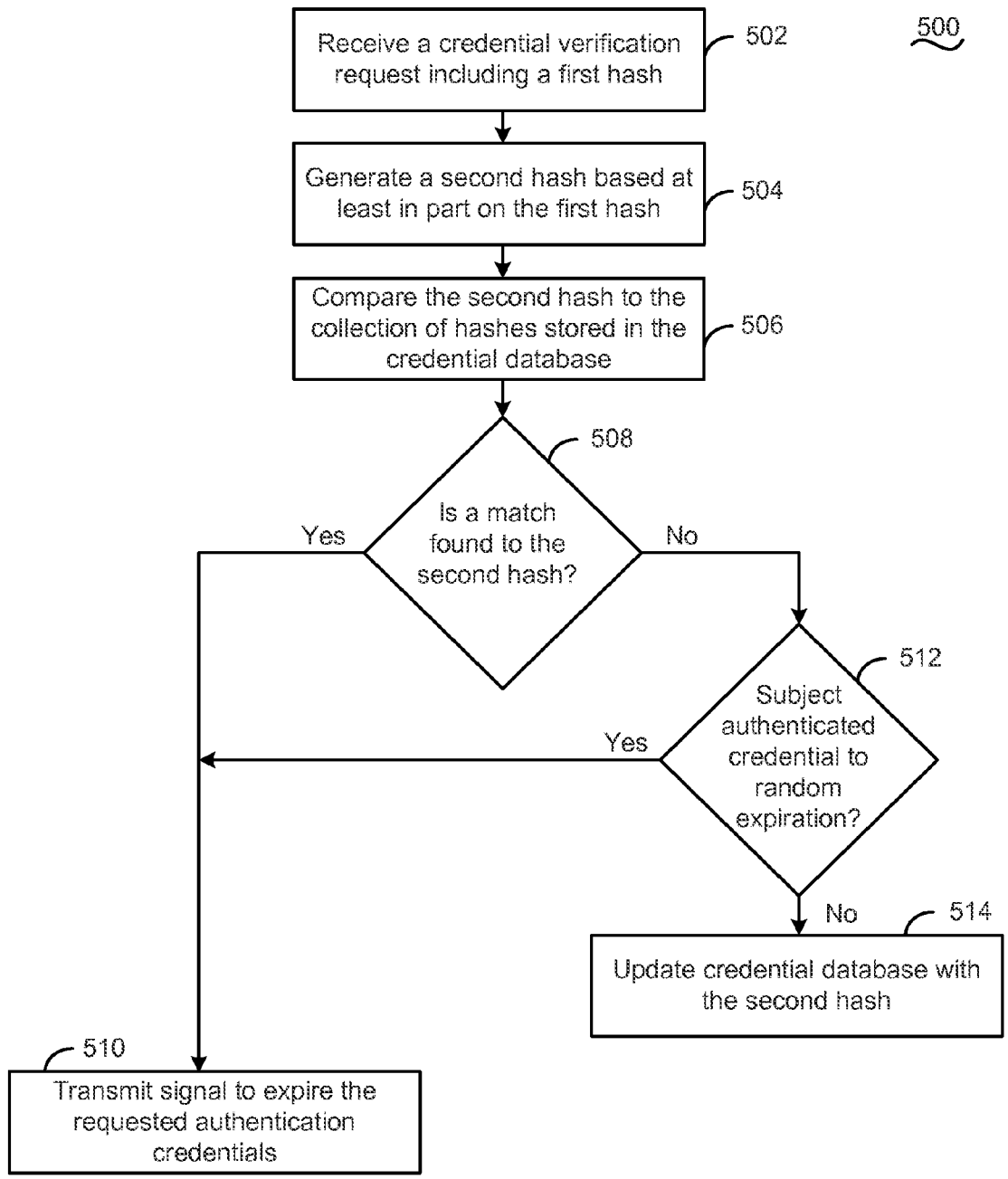
FIG. 5 illustrates a flow diagram representing an example method for verifying the uniqueness of and expiring authentication credentials, in accordance with embodiments of the disclosure.

Referring now to FIG. 5, another example method 500 of verifying and/or enforcing a unique authentication credential is illustrated. The method 500 may be performed by the credential verification servers 140. At lock 502, a credential verification request may be received. The credential verification servers 140 may receive the credential verification request. As described above in conjunction with method 200 and 300 of FIGS. 2 and 3, the credential verification request may include information associated with a user requested set of authentications credentials, such as a one-way hash of the requested authentication credentials. At block 504 a second hash may be generated based at least in part on the first hash associated with the requested authentication credentials. At block 506, the hash may be compared to a collection of hashes stored in the credential database. The mechanism for the generation of the second hash and comparison is similar to that discussed with reference to method 200 and 300 of FIGS. 2 and 3 and in the interest of brevity, will not be discussed here.

At block 508, it may be determined if there is a match found to the second hash associated with the requested authentication credentials. If a match to the second hash associated with the requested authentication credentials is found by the processors 144 of the credential verification servers 140 among the hashes available to the credential verification servers 140, then, at block 510, a message may be transmitted to the web service computer 110 to expire the requested authentication credentials. In other words, when the user 102 attempts to login to the web service computer 110 using the authentication credentials associated with the requested authentication credentials, the web service computer 110 may prompt the user 102 to select new authentication credentials. Therefore, a non-unique set of authentication credentials and verification of those non-unique authentication credentials may cause the credential verification servers 140 to indicate to the web service computer 110 to force a change in the authentication credentials associated with the user 102. In some cases, the web service computer may prompt the user to change the authentication credentials on a login attempt other than the first login attempt.

If, at block 508, it is determined that the second hash corresponding to the requested authentication request is unique, then, at block 512 it may be determined if the requested authentication credentials should be subject to a random expiration. If it is determined that the requested authentication credentials should be subjected to a random expiration at block 512, then the method 500 may proceed to block 510, where a message may be transmitted to the web service computer 110 to expire the requested authentication credentials. In certain embodiments, a predetermined number and/or percentage of requested authentication credentials found to be unique may be randomly expired. In the same or other embodiments, a random number generator, such as a random number generator implemented by the processors 144, may be used to determine if a unique set of requested authentication credentials should be expired. If at block 512 it is determined that the requested authentication credentials should not be subjected to a random expiration, then at block 514, the authentication credential database may be updated with the second hash.

It will be appreciated, that with method 500 since a predetermined number and/or percentage of unique requested authentication credentials are expired, the verification requesting web service computers 110 may have limited knowledge of non-unique authentication credentials based on rejected requested authentication credentials. Therefore, fewer parties, such as various web service computers 110 and their associated entities may have information about existing authentication credentials on other web services and/or websites.

Figure 6:
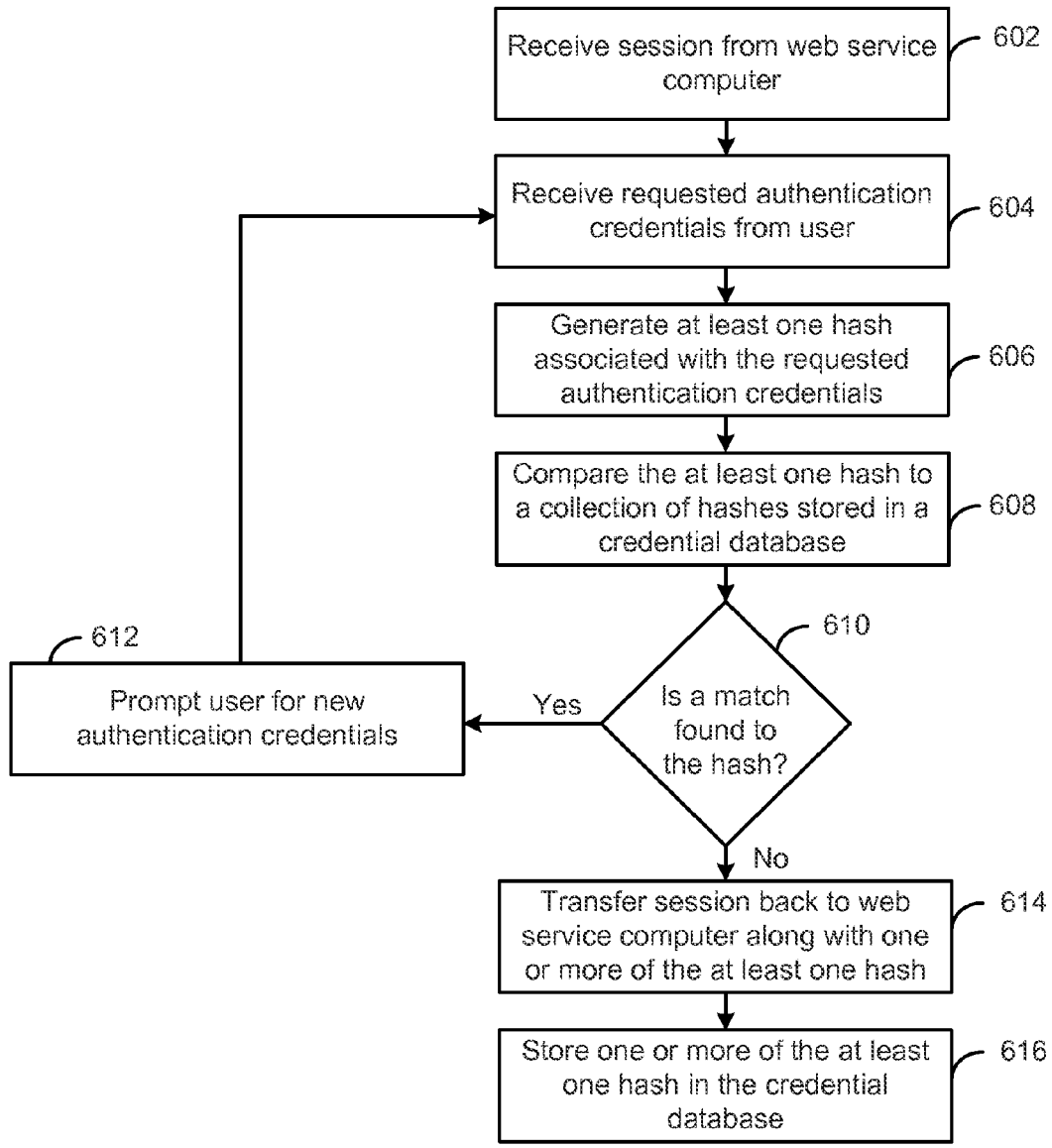
FIG. 6 illustrates a flow diagram representing an example method of transferring a web session to a third party service for verifying the uniqueness of authentication credentials, in accordance with embodiments of the disclosure.

Referring now to FIG. 6, yet another example method 600 of verifying and/or enforcing a unique authentication credential is illustrated. In this method 600, when a user 102 may wish to open an account with or otherwise access web services and/or websites associated with a web service computer 110, the web service computer may allow a third party, such as the credential verification servers 140 to establish authentication credentials for access. The method 600 may, therefore, be performed by the credential verification servers 140. At block 602, a session may be received from the web service computer. The session may be associated with the user 102 requesting access to web services and/or websites served by the web service computer 110. By transferring the session, the web service computer 110 may be requesting the credential verification servers 140 to establish authentication credentials associated with the user 102. In other words, the credential verification servers 140 may interact with the user 102 to establish authentication credentials for access to the web service computer 110 when the session is received by the credential verification servers 140. The session may be transferred to the credential verification server 140 by the web service computer 110 by the web service computer redirecting the user 102 from a website served by the web service computer 110 to a website served by the verification credential server. During the transfer, related metadata, identifiers and/or cookies may be transferred to uniquely identify the user and the associated session during the transfer from the web service computer to the credential verification servers 140. In certain embodiments, the user 102 may provide identifying information to the web service computer 110 prior to the session transfer to the credential verification servers 140. This identifying material may be used to track the session from the web service computer 110 to the credential verification servers 140. When the session is transferred the user may be able to interact with the credential verification servers 140 via the networks 108 and user device 104.

At block 604, requested authentication credentials may be received from the user. The user may interact with the credential verification server in a variety of ways including by interacting with a website served by the credential verification servers 140 to make an authentication credential request associated with the web service computer 110. For example, the user 102 may enter a login and password combination on a graphical interface rendered on user device 104 and served by the credential verification server 140.

At block 606, the credential verification server 140 may generate a hash associated with the requested authentication credentials. As discussed above with reference to methods 200, 300, 400, and 500 of FIGS. 2-5, the hash may be a one way hash of the requested authentication credentials. In certain embodiments, more than one hash may be generated for each element of the requested authentication credentials. For example, a hash may be generated for a login associated with the requested authentication credentials and another hash may be generated for the password associated with the requested authentication credentials. In certain embodiments, the hash associated with the requested authentication credentials may be doubly hashed. In other words a second hash may be performed on a first hash of the requested authentication credentials. In these embodiments, the second hash may be used for the process of verifying the uniqueness of the requested authentication credentials.

At block 608, the generated hash, corresponding to the requested authentication credentials, may be compared to a collection of hashes stored in the authentication credential database. As described above, the processors 144 may execute instructions, applications, and/or programs stored in the credential verification module 176 and/or the credential management module 178 to perform the comparison. The processors 144 may access the hashes associated with previously verified authentication credentials, currently active authentication credentials, and/or previously active authentication credentials from the credential database 180. In certain embodiments, these stored hashes may be doubly hashed authentication credentials, particularly when a double hash is performed by the processors 144 at block 606. The processors 144 may next compare the hash corresponding to the requested authentication credentials to the hashes accessed from the credential database 180. The comparison may be performed by comparing alphanumeric, hexadecimal, and/or binary symbols associated with the hash corresponding to the requested authentication credentials to each of the collection of stored hashes. Various algorithms may be employed to perform fast comparisons. These algorithms may include techniques such as partial symbol comparisons, as well as optimized database management to preferentially order the comparisons.

At block 610, it may be determined if any of the hashes in the collection of stored hashes matched the hash associated with the requested authentication credentials. If a match is found at block 610, then at block 612, the user may be prompted to select new authentication credentials. The method 600 may then return to block 604 to receive new authentication credentials from the user 102. Upon selecting new authentication credentials, the credential verification servers 140 may repeat the processes for verifying the uniqueness of the newly selected authentication credentials at blocks 606, 608, and 610. In certain embodiments, the user 102 may decide to cease the process of selecting authentication credentials and in this case, the credential verification servers 140 may return the session back to the web service computers 110 without establishing authentication credentials for the user 102.

If at block 608, if it is determined that a match is not found, then it may be ascertained by the credential verification servers 140 that the requested authentication credentials are unique among the authentication credentials associated with the hashes to which the credential verification servers 140 have access in the credential database 180. At block 614, when it is ascertained that the requested authentication credentials may be unique, the session may be transferred back to web service computer and the hash associated with the requested authentication credentials may transmitted to the web service computers. Similar to the session transfer at block 602, transferring the session at block 614 may entail redirecting the user 102 from a website and/or service hosted by the credential verification servers 140 to one that is hosted by the web service computer 110. The transmittal of the hash may be in the form of one or more data packets. Therefore, in certain embodiments, the web service computer 110 may not receive the plain text version of the authentication credential and, instead, may only receive the hash of the authentication credentials. When the user 102 in subsequent sessions try to access the web service computer 110, the web service computer may receive the plain text authentication credentials and then perform a hash on the plain text credentials and compare the hash to the hash transmitted to the web service computer 110 from the credential verification servers 140 at block 614.

In embodiments where two hashes are performed at block 606, the first hash may be transferred to the web service computer 110 by the credential verification servers 140. Therefore, the second hash may be used for uniqueness verification purposes at blocks 608 and 610 and the first hash may be transferred to the web service computer 110 for the purposes of future user 102 authentication by the web service computer 110. In certain embodiments, the credential verification servers 140, after transferring the first hash, may erase or delete any records associated with the first hash so that the authentication mechanism of the web service computer 110 may not be compromised if the credential verification server 140 records are compromised.

At block 616, the hash may be stored in the credential database along with the collection of other hashes. Therefore, the addition of the new hash corresponding to the requested authentication credentials to the credential database 180 may enable the credential verification servers 140 to check uniqueness of future requested authentication credentials against the newly added hash. As described above, in certain embodiments, two hashes may be performed at block 606. In this case, the second hash may be used for the purposes of authentication credential uniqueness verification at blocks 608 and 610 and, therefore, the second hash may be stored, at block 616, in the credential database 180. In these embodiments, the first hash associated with the requested authentication credentials may be transferred to the web service computer 110 at block 614 and the credential verification servers 140 may purge all records of that first hash for the purposes of reducing the chances of that first hash being compromised.

It should be noted that in certain embodiments, the method 600 may be executed to change the user's authentication credentials. In this case, at block 602 a hash corresponding to user's existing authentication credentials may be transmitted to the credential verification server 140 by the web service computers 110 when the session is transferred to the credential verification server 140. This hash may be a one-way hash of the user's authentication credentials that may have been previously established by the credential verification server 140, such as at block 606, and transferred to the web service computer 110 by the credential verification server at block 614, when the requested authentication credentials were established as the user's authentication credentials. This hash when received by the credential verification server 140 may be used by the credential verification server 140 to update the credential database 180. In one aspect, a hash of the received hash may be performed and the resulting hash may be removed from the credential database 180. In other embodiments, the hash of the received hash may be tagged or otherwise marked, such as with an indication in associated metadata, that the associated authentication credential is no longer in use. This updating may be performed because once a new authentication credential is established for the user 102, the old authentication credentials associated with the hash received at block 602 may be available as a valid authentication credentials. In other words, if the same or another user was to select the old authentication credentials as requested authentication credentials subsequent to changing the authentication credentials, then that old authentication credential will be determined to be unique among all the authentication credentials associated with the credential database 180.

From the perspective of the web service computers 110, a session may be established with a user 102. Upon receiving an indication that the user 102 wishes to establish and/or change authentication credentials, such as by user 102 interactions on a website, the web service computer 110 may transfer the session over to the credential verification server 140. The credential verification server 140 may then evaluate the user's requested authentication credential and based thereon, establish authentication credentials for the user. At that point, the web service computer 110 may receive the session back from the credential verification server 140. The web service computer 110 may further receive a hash of the newly established authentication credentials associated with the user 102. This hash may be used by the web service computer to authenticate the user for subsequent access to websites and/or services offered by the web service computer 110. For example, when the user 102 attempts to login to a website provided by the web service computer 110, the user 102 may provide his/her authentication credentials. The web service computer 110 may perform a hash, such as a one-way hash, provided by the user 102 and determine based thereon if the user should be allowed access to the website.

It will be appreciated that by transferring a web session to the credential verification servers 140, the web service computers may not be able to garner information associated with authentication credentials that may be available on other web service computers 110. For example, if a web service computer 110 provides a requested authentication credential to the credential verification servers 140, then web service computer 110, the entities controlling the web service computer 110, and/or the user 102 may be able to ascertain that the requested authentication credential that is rejected for not being unique may be in use by a user 102 on the same or another web service computer 110. When the session is transferred to the credential verification server 140 for the establishment of the authentication credentials, the web service computer 110 may not have access to the information of which authentication credentials are not unique.

It will further be appreciated that in the implementation of method 600, the credential verification servers 140 may have access to a variety of algorithms for generating hashes.

It should be noted, that the method 600 may be modified in various ways in accordance with certain embodiments of the disclosure. For example, one or more operations of the method 600 may be eliminated or executed out of order in other embodiments of the disclosure. Additionally, other operations may be added to the method 600 in accordance with other embodiments of the disclosure.

Figure 7:
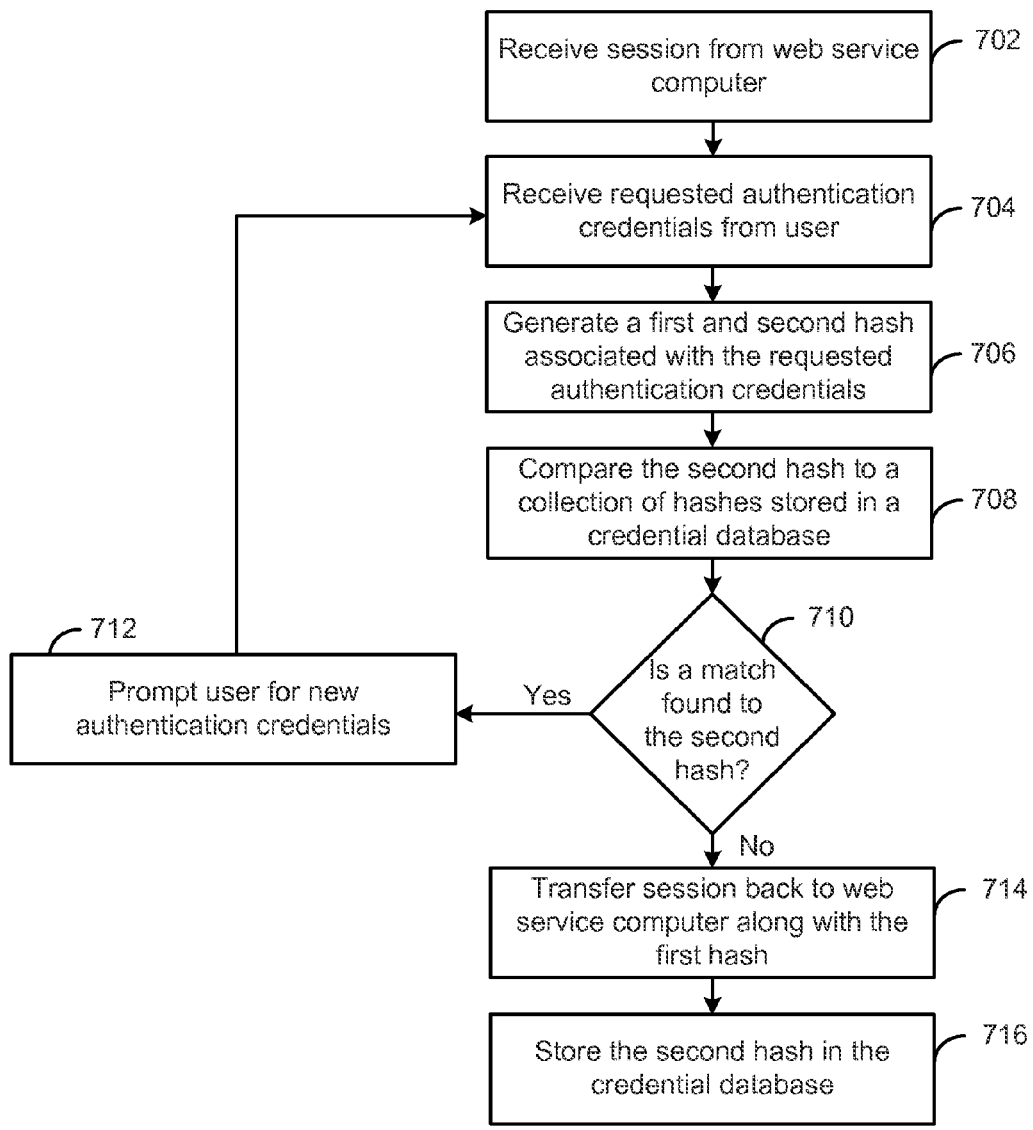
FIG. 7 illustrates a flow diagram representing an example method of transferring a web session to a third party service for verifying the uniqueness of authentication credentials, in accordance with embodiments of the disclosure.

Referring now to FIG. 7, illustrates a flow diagram representing an example method 700 of transferring a web session to a third party service for verifying the uniqueness of authentication credentials. The method 700 may be a particular implementation of method 600 of FIG. 6. In this method 700, as in method 600 of FIG. 6, when a user 102 may wish to open an account with or otherwise access web services and/or websites associated with a web service computer 110, the web service computer may allow a third party, such as the credential verification servers 140 to establish authentication credentials for access. The method 700 may, therefore, be performed by the credential verification servers 140. At block 702, a session may be received from the web service computer. The session may be associated with the user 102 requesting access to web services and/or websites served by the web service computer 110. By transferring the session, the web service computer 110 may be requesting the credential verification servers 140 to establish authentication credentials associated with the user 102. The session may be transferred to the credential verification server 140 by the web service computer 110 by the web service computer redirecting the user 102 from a website served by the web service computer 110 to a website served by the verification credential server. During the transfer, related metadata, identifiers and/or cookies may be transferred to uniquely identify the user and the associated session during the transfer from the web service computer to the credential verification servers 140. In certain embodiments, the user 102 may provide identifying information to the web service computer 110 prior to the session transfer to the credential verification servers 140. This identifying material may be used to track the session from the web service computer 110 to the credential verification servers 140. When the session is transferred the user 102 may be able to interact with the credential verification servers 140 via the networks 108 and user device 104.

At block 704, requested authentication credentials may be received from the user. The user may interact with the credential verification server in a variety of ways including by interacting with a website served by the credential verification servers 140 to make an authentication credential request associated with the web service computer 110. For example, the user 102 may enter a login and password combination on a graphical interface rendered on user device 104 and served by the credential verification server 140.

At block 706, the credential verification server 140 may generate a first and second hash associated with the requested authentication credentials. The first hash may be a one way hash of the requested authentication credentials. The second hash may be a one way hash of the first hash. In certain embodiments, more than one hash may be generated for each element of the requested authentication credentials. For example, a hash may be generated for a login associated with the requested authentication credentials and another hash may be generated for the password associated with the requested authentication credentials. The first hash, in certain embodiments, may be generated using algorithms that may be specific to the web service computer 110 from which the session was received at block 702. The second hash may ultimately be used for purposes of authentication credential verification. In some cases, the first hash may be generated using algorithms specific to the web service computer 110 from which the session was received and the second hash may be a single or doubly hashed hash that is generated using a different algorithm than the algorithm used to generate the first hash. Indeed, the algorithms used to generate the second hash associated with the requested authentication credentials associated with any of the affiliated web service computers 110 may be the same. This may be done to facilitate the usage of the second hash for purposes of comparison and determination of the uniqueness of associated requested authentication credentials.

At block 708, the generated second hash corresponding to the requested authentication credentials, may be compared to a collection of hashes stored in the authentication credential database. As described above, the processors 144 may execute instructions, applications, and/or programs stored in the credential verification module 176 and/or the credential management module 178 to perform the comparison. The processors 144 may access the hashes associated with previously verified authentication credentials, currently active authentication credentials, and/or previously active authentication credentials from the credential database 180. In certain embodiments, the stored hashes may be generated using the same processes and algorithms as was used to generate the second hash at block 706. The processors 144 may next compare the second hash corresponding to the requested authentication credentials to the hashes accessed from the credential database 180. The comparison may be performed by comparing alphanumeric, hexadecimal, and/or binary symbols associated with the hash corresponding to the requested authentication credentials to each of the collection of stored hashes. Various algorithms may be employed to perform fast comparisons. These algorithms may include techniques such as partial symbol comparisons, as well as optimized database management to preferentially order the comparisons.

At block 710, it may be determined if any of the hashes in the collection of stored hashes matched the second hash associated with the requested authentication credentials. If a match is found at block 710, then at block 712, the user may be prompted to select new authentication credentials. The method 700 may then return to block 704 to receive new authentication credentials from the user 102. Upon selecting new authentication credentials, the credential verification servers 140 may repeat the processes for verifying the uniqueness of the newly selected authentication credentials at blocks 706, 708, and 710. In certain embodiments, the user 102 may decide to cease the process of selecting authentication credentials and in this case, the credential verification servers 140 may return the session back to the web service computers 110 without establishing authentication credentials for the user 102.

If at block 708, if it is determined that a match is not found, then it may be ascertained by the credential verification servers 140 that the requested authentication credentials are unique among the authentication credentials associated with the hashes to which the credential verification servers 140 have access in the credential database 180. At block 714, when it is ascertained that the requested authentication credentials may be unique, the session may be transferred back to web service computer and the first hash associated with the requested authentication credentials may be transmitted to the web service computer 110. Similar to the session transfer at block 702, transferring the session at block 714 may entail redirecting the user 102 from a website and/or service hosted by the credential verification servers 140 to one that is hosted by the web service computer 110. The transmittal of the first hash may be in the form of one or more data packets. Therefore, in certain embodiments, the web service computer 110 may not receive the plain text version of the authentication credential and, instead, may only receive the first hash of the authentication credentials. When the user 102 in subsequent sessions try to access the web service computer 110, the web service computer may receive the plain text authentication credentials and then perform a hash on the plain text credentials and compare the hash to the first hash transmitted to the web service computer 110 from the credential verification servers 140 at block 714.

At block 716, the second hash may be stored in the credential database along with the collection of other hashes. Therefore, the addition of the new hash corresponding to the requested authentication credentials to the credential database 180 may enable the credential verification servers 140 to check uniqueness of future requested authentication credentials against the newly added hash. The credential verification servers 140 may also purge all records of the first hash for the purposes of reducing the chances of that first hash being compromised.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system for verifying uniqueness of authentication credentials, comprising:
   at least one memory that stores computer-executable instructions; and
   at least one processor configured to access the at least one memory, wherein the at least one processor is configured to execute the computer-executable instructions to:
   accept a session from a first domain, wherein a user requests to establish a new authentication credential or change an existing authentication credential associated with the first domain;
   receive a requested authentication credential associated with the session and the user;
   generate a first hash associated with the requested authentication credential based at least in part on the requested authentication credential;
   generate a second hash associated with the requested authentication credential based at least in part on the first hash;

access a database storing one or more stored hashes associated with corresponding respective authentication credentials associated with one or more second domains;
compare the second hash to the one or more stored hashes on the database to identify that the second hash does not match any of the one or more stored hashes;
determine based at least in part on the comparing that the requested authentication credential is not being used by the user as an authentication credential at the one or more second domains;
transmit the first hash to the first domain after determining that the requested authentication credential is not being used by the user as an authentication credential at the one or more second domains;
delete the first hash;
transfer the session to the first domain; and
store the second hash on the database.

2. The system of claim 1, wherein the session comprises an interaction between the user and the first domain, and wherein the first domain authenticates the user based at least in part on the first hash associated with the requested authentication credential.

3. The system of claim 1, wherein the requested authentication credential comprises at least one of: (i) one or more logins; (ii) one or more passwords; (iii) one or more images; (iv) one or more sounds; (v) one or more personal information; or (vi) one or more biometric information.

4. The system of claim 1, wherein the first hash associated with the requested authentication credential comprises at least one of: (i) an encryption of the requested authentication credential; (ii) an encryption of a portion of the requested authentication credential; (iii) a hash of the requested authentication credential; (iv) a hash of a portion of the requested authentication credential; (v) a one-way hash of the requested authentication credential; (vi) a one-way hash of a portion of the requested authentication credential.

5. The system of claim 1, wherein the user is a first user, the session is a first session, the requested authentication credential is a first requested authentication credential, and the at least one processor is further configured to execute the computer-executable instructions to:
accept a second session from the first domain, wherein a second user requests a second requested authentication credential;
receive a third hash associated with the second requested authentication credential;
generate a fourth hash associated with the second requested authentication credential and based at least in part on the third hash;
access the database;
compare the fourth hash to the one or more stored hashes on the database to identify that the fourth hash matches one of the one or more stored hashes; and
determine, based at least in part on the comparing, that the second requested authentication credential is not unique.

6. The system of claim 5, wherein the at least one processor is further configured to execute the computer-executable instructions to:
indicate to the second user, based at least in part on the comparing, that the second requested authentication credential is already being used as an authentication credential at the one or more second domains; and
direct the second user to request a different authentication credential.

7. A method for verifying uniqueness of authentication credentials, comprising:
accepting, by one or more credential verification servers comprising at least one processor, a session associated with a first entity, wherein a user requests to establish a new authentication credential or change an existing authentication credential associated with the first entity;
receiving, by the one or more credential verification servers, a requested authentication credential associated with the session and the user;
generating a first hash based at least in part on the requested authentication credential;
generating a second hash based at least in part on the first hash;
comparing, by the one or more credential verification servers, the second hash to one or more stored hashes on a database associated with corresponding respective authentication credentials associated with at least one of: (i) one or more second entities or (ii) the first entity to identify that the second hash does not match any of the one or more stored hashes;
transmitting the first hash to the first entity after determining that the requested authentication credential is different from authentication credentials associated with the one or more stored hashes;
deleting, by the one or more credential verification servers, the first hash;
transferring, by the one or more credential verification servers, the session to the first entity; and
storing, by the one or more credential verification servers, the second hash on the database.

8. The method of claim 7, wherein the requested authentication credential comprises at least one of: (i) one or more logins; (ii) one or more passwords; (iii) one or more images; (iv) one or more sounds; (v) one or more personal information; or (vi) one or more biometric information.

9. The method of claim 7, wherein the session comprises an interaction between the user and the first entity, and wherein the first entity authenticates the user based at least in part on the first hash associated with the requested authentication credential.

10. The method of claim 7, wherein the first hash is a one-way hash of the requested authentication credential and the second hash is a one-way hash of the first hash.

11. The method of claim 7, wherein the user is a first user, the session is a first session, the requested authentication credential is a first requested authentication credential, and the method further comprises:
accepting, by the one or more credential verification servers, a second session, wherein a second user requests to establish a second requested authentication credential or change an existing authentication credential to the second requested authentication credential;
generating, by the one or more credential verification servers, a third hash based at least in part on the second requested authentication credential;
generating, by the one or more credential verification servers, a fourth hash based at least in part on the third hash;
comparing, by the one or more credential verification servers, the fourth hash to the one or more stored hashes on the database to identify that the fourth hash matches at least one of the one or more stored hashes; and
determining, by the one or more credential verification servers, that the second requested authentication credential is the same as an authentication credential associated with the one or more stored hashes.

12. The method of claim 11, further comprising:
indicating to the second user, based at least in part on the comparing, that the second requested authentication credential is not unique; and
directing the second user to request a different authentication credential.

13. The method of claim 11, further comprising:
transferring, by the one or more credential verification servers, the second session to the first entity indicating that the second requested authentication credential has not been established.

14. The method of claim 7, wherein the first entity and the one or more second entities are at least one of: (i) one or more websites; (ii) one or more web services; (iii) one or more domains; (iv) one or more corporations; (v) one or more organizations; (vi) one or more government organizations; (vii) one or more non-profit organizations; or (viii) one or more foreign organizations.

15. At least one non-transitory computer-readable medium comprising computer-executable instructions that, when executed by one or more processors, executes a method comprising:
establishing a session with a user;
receiving an indication that the user wishes to establish or change an authentication credential;
transferring the session to a credential verification server, wherein transferring the session enables the user to interact with the credential verification server to verify the uniqueness of a requested authentication credential;
receiving the session back from the credential verification server, wherein receiving the session comprises receiving a first hash value generated based at least in part on the requested authentication credential, and wherein a second hash value generated based at least in part on the first hash value was compared with a plurality of stored hash values associated with pre-existing authentication credentials to identify that the second hash value did not match any of the plurality of stored hash values to determine that the requested authentication credential is unique; and
storing the first hash value in a database storing one or more stored hash values associated with corresponding respective authentication credentials.

16. The at least one non-transitory computer-readable medium of claim 15, wherein the session is associated with providing the user with access to at least one of: (i) one or more websites; (ii) one or more web services; (iii) one or more domains; (iv) one or more corporations; (v) one or more organizations; (vi) one or more government organizations; (vii) one or more non-profit organizations; or (viii) one or more foreign organizations.

17. The at least one non-transitory computer-readable medium of claim 15, wherein the method further comprises authenticating the user based at least in part on the first hash value associated with the requested authentication credential.

18. The at least one non-transitory computer-readable medium of claim 15, wherein the first hash value is a one-way hash of the authentication credential and the second hash value is a one-way hash of the first hash value.

19. The at least one non-transitory computer-readable medium of claim 15, wherein transferring the session to a credential verification server further comprises transmitting a third hash value previously generated based at least in part on a current authentication credential associated with the user, and wherein the third hash value is stored in the database based at least in part on a previous verification of the uniqueness of the current authentication credential.

* * * * *